(12) United States Patent
Mansfield et al.

(10) Patent No.: US 6,239,186 B1
(45) Date of Patent: May 29, 2001

(54) SILICONE SURFACTANTS FOR THE PRODUCTION OF OPEN CELL POLYURETHANE FLEXIBLE FOAMS

(75) Inventors: Kevin Francis Mansfield, Harleysville, PA (US); David Robert Battice, Prudenville, MI (US); Allen Robert Arnold, Jr., Catasauqua, PA (US); Stephan Herman Wendel, Oldenburg (DE); John Herbert Frey, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/428,780

(22) Filed: Oct. 28, 1999

(51) Int. Cl.$^7$ .......................................................... C08J 9/04
(52) U.S. Cl. .......................... 521/112; 521/130; 521/131; 521/134; 521/155; 521/170; 521/172; 521/174
(58) Field of Search .................................... 521/112, 130, 521/131, 134, 155, 170, 172, 174

(56) References Cited

U.S. PATENT DOCUMENTS

| 4,042,540 | 8/1977 | Lammerting et al. . |
| 4,139,503 | 2/1979 | Kollmeier et al. . |
| 4,347,330 | 8/1982 | Demou . |
| 5,633,292 | 5/1997 | Brüne et al. . |
| 5,844,010 | * 12/1998 | Burkhart et al. ..................... 521/112 |

* cited by examiner

*Primary Examiner*—John M. Cooney, Jr.
(74) *Attorney, Agent, or Firm*—Michael Leach

(57) ABSTRACT

A method for preparing a polyurethane flexible foam which comprises reacting an organic polyisocyanate with a polyol in the presence of urethane catalyst, water as a blowing agent, optionally a cell opener, and a polydimethylsiloxane cell stabilizer composition which comprises at least 90 wt % of polydimethylsiloxane molecules having the formula:

$$Me_3Si(OSiMe_2)_nOSiMe_3$$

where n is 5 to 7, provided at least 15 wt % of each of the three molecules in which n is 5, 6 and 7 is present.

20 Claims, No Drawings

SILICONE SURFACTANTS FOR THE PRODUCTION OF OPEN CELL POLYURETHANE FLEXIBLE FOAMS

FIELD OF THE INVENTION

The invention relates to making polyurethane flexible foams using silicone surfactants as cell stabilizers.

BACKGROUND OF THE INVENTION

Polyurethane foam production involves the accurate pumping, mixing, and dispensing of several components or streams into a mold or onto a moving conveyor belt. The number of streams can be from two to seven; however, the typical formulation is composed of two streams consisting of an isocyanate stream and a resin stream. The resin stream is a mixture of polyether or polyester polyols, cross-linkers (e.g., diethanolamine), surfactant, catalyst, water, auxiliary blowing agents, and other additives. The isocyanate stream comprises toluene diisocyanate (TDI), various forms of diphenylmethane diisocyanate (MDI), or a mixture of the two.

A superior quality flexible molded foam displays several important characteristics. It will have good bulk, vent, and shear stability which implies the foam has a small, uniform cellular structure throughout the interior of the foam. These foams will also display good surface stability, defined as having a layer of fine cells adjacent to the outer surface of the foam, and good dimensional stability (i.e., exhibit a reduced tendency to shrink after being removed from the mold). Foams that are less susceptible to shrinkage will be easier to process, require less mechanical crushing which can weaken the physical integrity of the polyurethane, and have lower scrap and repair rates. Superior quality non-molded flexible foams primarily require good bulk dimensional stability, which if absent will lead to foam collapse or severe densification. Reducing the overall emission of additives from a flexible foam is also desirable, for this can lead to reduced automotive windshield fogging as an example.

The manufacturing equipment and chemicals have an important effect on the quality of the foam; however, the surfactant is often one of the most critical components of the formulation as it has a direct and significant influence on the bulk, vent, shear, surface, and dimensional stability as well as the emissions of the foam.

In the past, chemical strategies for selecting formulation variables in order to optimize bulk, shear, vent, surface, and dimensional stability have been successful for many polyurethane foam applications. Key variables include the judicious selection of surfactants and catalysts, and the incorporation of cell opening polyols.

The foam industry is now facing cost reduction issues, and is challenged with maintaining foam physical properties while at the same time reducing their raw materials and processing costs. Approaches include reducing foam density by incorporating more water in the formulation or injecting liquid carbon dioxide, lowering the amount of relatively expensive graft copolymers, using blends of TDI/MDI, and incorporating isocyanate terminated prepolymers. All of these approaches have placed increasing challenges on the accompanying additives, particularly in terms of maintaining foam dimensional stability.

Silicone surfactants used for the production of flexible polyurethane foams are typically polydimethylsiloxane (PDMS) fluids and/or organomodified PDMS fluids such as siloxane polyether copolymers.

The PDMSs used in flexible polyurethane foams, including high resiliency (HR) foams, generally are a mixture or distribution of straight-chained or branched, fractionated PDMSs with chain lengths DP (DP=n+2, where n is the number of dimethylsiloxane units) ranging from 5 to 20.

U.S. Pat. No. 4,139,503 discloses a process for making high resiliency polyurethane foams using specific siloxane components. Polydimethylsiloxanes with DP less than 7 (n<5) are taught as ineffective but having no adverse effect while PDMSs with DP greater than 20 (n>18) have a highly undesirable defoaming or antifoaming effect. Using PDMS fluids containing the wide spectrum of molecular weights disclosed by U.S. '503 will reduce the openness of the foam and lead to shrinkage.

U.S. Pat. No. 4,042,540 discloses making highly elastic soft polyurethane foams in the presence of certain low molecular weight organopolysiloxanes, including PDMSs. The DP of the PDMS is 4 to 12 (n=2–10), while 4 to 10 (n=2–8) is preferred, and 6 to 8 (n=4–6) being especially preferred. Higher molecular weight PDMS species should only be present in very small amounts, as DP higher than 9 (n>7) leads to a noticeable increase in the tendency of the foam to shrink. Lower molecular weight products can be used in a mixture without objection. Example 4 of U.S. '540 demonstrates that a mixture of PDMSs having a DP span of 5 to 9 (n=3–7) made a non-shrinking foam, while a mixture of PDMSs having a DP span of 8 to 14 (n=6–12) lead to shrinkage. U.S. '540 also discloses that pure molecular weight cuts of PDMS fluids with a DP below 8 (n<6) have a different efficacy for preventing foam shrinkage.

U.S. Pat. No. 4,347,330 discloses making high resilience open celled flexible polyurethane foams using three cell modifiers consisting of a polysiloxane-polyoxyalkylene copolymer, a polymethylsiloxane, and a polyether polyol cell modifier containing polyoxyethylene groups.

U.S. Pat. No. 5,633,292 discloses the production of high resilience polyurethane foams using particular polysiloxane cell stabilizers.

There are many references that teach the use of organomodified, or organofunctional, PDMSs in flexible foam. This class of silicone surfactant is always required in formulations where the resulting foam will collapse when no silicone is present. Generally these structures will stabilize the foam but will also give rise to poor dimensional stability.

SUMMARY OF THE INVENTION

The present invention provides a cell stabilizer composition comprising a particular narrow molecular weight distribution of polydimethylsiloxane (PDMS) surfactants, that can be used alone or in combination with organomodified PDMS fluids to produce an open cell flexible polyurethane foam. The PDMSs can be either straight chained or branched.

The invention is a method for preparing polyurethane flexible foam using a composition which comprises a particular, narrow molecular weight distribution of PDMS surfactants. The method comprises reacting an organic polyisocyanate and a polyol in the presence of a catalyst composition, a blowing agent, preferably water, a PDMS composition, and optionally a cell opening agent. The PDMS cell stabilizer composition comprises polydimethylsiloxanes having the formula:

$Me_3Si(OSiMe_2)_nOSiMe_3$ where n=5–7 inclusive; the composition comprising at least 90 wt % of PDMSs in which n is 5, 6 and 7 with at least 15 wt % each of these three PDMS species being present. Accordingly, the degree of polymerization (DP), or chain length, of the PDMSs composing the composition is 7 to 9 since DP=n+2.

The polyurethane foam may be prepared using any conventional flexible polyurethane foam process or the "quasi-prepolymer" flexible polyurethane foam process.

The use of the particular PDMS cell stabilizer composition comprising at least 90 wt % of PDMSs in which DP is 7 to 9 in making polyurethane flexible molded foam affords increased openness of the foam beyond what is needed to prevent shrinkage as measured by lower force-to-crush (FTC) values.

Additional properties of the flexible foam that can be improved by the use of the defined PDMS composition include bulk stability, surface stability, vent stability and dimensional stability.

The above benefits derive from the PDMS composition comprising an efficient and practical molecular weight distribution of PDMS species.

DETAILED DESCRIPTION OF THE INVENTION

The PDMS cell stabilizer compositions used in the preparation of the flexible foams comprise at least 90 wt %, preferably at least 95 wt %, of PDMS molecules having the formula:

$$Me_3Si(OSiMe_2)_nOSiMe3$$

where n is 5 to 7, provided that at least 15 wt %, preferably at least 20 wt %, of each of the n=5, 6 and 7 species is present.

Contemplated as functional equivalents of the PDMSs for purposes of this invention are those molecules in which the methyl groups are replaced by C2–C3 alkyl groups, an aryl group, alkylaryl group, or alkyl capped poly(alkyleneoxide) group.

PDMSs of higher and lower values of n can be present in the cell stabilizer composition, although at less than 10 wt %, preferably at less than 5 wt %. Higher n values will give rise to significantly higher foam force-to-crush values, i.e., the foam will be less open and will shrink more. Lower n values will lower the cell opening efficiency of the PDMS composition. Eliminating the n values below 5 also has the advantage of lowering the volatility of the resulting PDMS composition, thereby potentially reducing windshield fogging due to emissions from interior automotive foam. Cyclic and branched PDMSs can also be present in the PDMS cell stabilizer composition, although preferably at less than 5 wt %.

The PDMS cell stabilizer compositions comprising PDMSs of n=5 to 7 are used in an amount of 0.01 to 0.8, preferably 0.05 to 0.4, wt parts per hundred wt parts polyol (pphpp).

These PDMS surfactant compositions can be prepared according to the techniques well known in the art, for example as taught in U.S. Pat. No. 4,042,540 which is incorporated herein by reference, and can optionally, but preferably, be used in combination with other silicone surfactants well known as cell stabilizers for making polyurethane foams, such as organomodified PDMSs, e.g., modified with polyalkylene ether functionality, and with silicone cell openers, e.g., as taught in U.S. Pat. Nos. 5,192,812 and U.S. 5,852,065. When used in such combination, the PDMS composition according to the invention may compose about 25–95 wt %, preferably about 50–95 wt %, of the total silicone surfactant composition on an actives basis.

Making the PDMS composition of this invention first involves the synthesis of a broad molecular weight distribution of PDMSs encompassing the DP range of 7 to 9. The preferred distribution is then obtained through a fractional distillation process, as taught in U.S. Pat. No. 4,042,540.

The PDMS compositions according to the invention are employed in the manufacture of polyether and polyester flexible polyurethane foams in the manner known to the art. "Flexible" foams are intended to include slab and molded foams, semi-flexible (semi-rigid) and high resiliency (HR) foams, as these terms are known in the art. In producing the polyurethane foams using these PDMS compositions, one or more polyether or polyester polyols are reacted with a polyisocyanate to provide the urethane linkage. In the present invention the polyol composition may comprise one or more of such polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a trio in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 4–80% of the polyol portion of the masterbatch.

The polyurethane products are prepared using any suitable organic polyisocyanates well known in the art including, for example, hexamethylene diisocyanate, phenylene diisocyanate, toluene diisocyanate (TDI) and 4,4'-diphenyl-methane diisocyanate (MDI). Especially suitable are the 2,4- and 2,6-TDIs individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

The present invention is applicable to flexible and semi-flexible molded foam made with MDI, TDI, or MDI/TDI blends as well as to highly resilient flexible slabstock foam.

Suitable urethane catalysts useful in the present invention are all those well known to the worker skilled in the art including tertiary amines such as triethylene-diamine, N-methylimidazole, 1,2-dimethylimidazole, N-methylmorpholine, N-ethyl-morpholine, triethylamine, tributylamine, pentamethyidiethylenetriamine, pentamethyl-dipropylenetriamine, triethanolamine, dimethylethanolamine and bisdimethylamino-diethylether, and organotins such as stannous octoate, stannous acetate, stannous oleate, stannous laurate, dibutyltin dilaurate, and other such tin salts.

Other typical agents which may be found in the polyurethane foam formulations include chain extenders such as ethylene glycol and butanediol; crosslinkers such as diethanolamine, diisopropanolamine, triethanolamine and tripropanolamine; cell openers such as silicones; and especially blowing agents such as water, liquid carbon dioxide, acetone, pentane, HFCs, HCFCs, CFCs, methylene chloride and the like.

The preferred polyurethane flexible molded foam prepared according to the invention is a high resiliency foam.

A general polyurethane flexible foam formulation having a 1–3.75 lb/ft$^3$ (16–60 kg/m$^3$) density containing a PDMS cell stabilizer composition according to the invention would comprise the following components in parts by weight (pbw):

| Flexible Foam Formulation | pbw |
| --- | --- |
| Polyol | 20–100 |
| Polymer Polyol | 80–0 |
| PDMS Cell Stabilizer | 0.01–0.8; pref 0.05–0.4 |
| Cell Opener | 0–3 |
| Water | 1–6, pref 2–4.5 |
| Auxillary Blowing Agent | 0–10 |
| Crosslinker | 0.5–2 |
| Urethane Catalyst | 0.3–3 |
| Isocyanate Index | 70–115 |

In the present invention the preferred blowing agent for making flexible molded foams is water at 1 to 6 parts per hundred parts polyol (pphpp), especially 2 to 4.5 pphpp, optionally with other blowing agents.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. In another embodiment the molded flexible foams are made by the "quasi-prepolymer process" as taught in U.S. Pat. Nos. 5,708,045 and 5,650,452. In either case, it is sometimes convenient to add the silicone surfactants (cell opener and cell stabilizer) to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and silicone surfactant cell opener and cell stabilizer are each present in a minor amount sufficient to foam the reaction mixture. The catalysts are present in a catalytic amount, i.e., that amount necessary to catalyze the reactions to produce the urethane and urea at a reasonable rate, and the PDMS cell stabilizer surfactants are present in the amount sufficient to impart the properties desired and to stabilize the reacting foam, for example, 0.01 to 0.8 pphpp.

The PDMS cell stabilizers are preferably used in MDI systems and when used in a production MDI machine run the amounts range from 0.03 to 0.1 pphpp actives, preferably about 0.05 pphpp. In TDI based systems, an additional silicone cell stabilizer probably will be needed in combination with the PDMS cell stabilizer of the invention. (See Example 3.)

In a typical preparation, the polyol, water, silicone surfactants, amine catalyst, optional tin catalyst and optional other blowing agent are blended together and finally TDI is mixed in and the composition is allowed to foam and polymerize.

In the Examples and Tables the following materials were used:

Arcol 1674 polyol from Lyondell (OH#=26.8)

DABCO 33-LV® catalyst from Air Products and Chemicals, Inc. (APCI)

DABCO® BL-11 catalyst from APCI

DABCO BL-17 catalyst from APCI

DABCO® DC 5043 surfactant from APCI

POLYCAT® 15 catalyst from APCI

Voranol CP 1421 cell opening polyol from Dow Chemical

Voranol 232-027 polyol from Dow Chemical

XSS-84236 polyol from Dow Chemical

XUS-16111 polyol from Dow Chemical

TDI 80/20 from Bayer

Mondur MRS-5 MDI from Bayer

Mondur TDI from Bayer

Suprasec X2447 MDI from ICI

The following flexible foam formulations A-C were used in the Examples with the components in parts by weight (pbw):

| Component | A | B | C |
| --- | --- | --- | --- |
| Arcol 1674 | 100 | | |
| Voranol 232–027 | | 100 | |
| XSS-84236 | | | 60 |
| XUS-16111 | | | 40 |
| Voranol CP 1421 | 1.3 | 1.5 | |
| PDMS composition | varies | varies | varies |
| Dabco DC 5043 | | | varies |
| Diethanolamine | 0.57 | 0.6 | 0.85 |
| Water | 3.55 | 3.5 | 3.15 |
| Dabco BL-11 | 0.15 | 0.25 | |
| Dabco BL-17 | | | 0.20 |
| Dabco 33-LV | 0.28 | 0.20 | 0.30 |
| Polycat 15 | 0.30 | | |
| Suprasec X2447 MDI | 57.34 | | |
| Mondur MRS-5 MDI | | 59.65 | |
| Mondur TDI | | | 37.08 |

In the following Examples, to minimize weighing errors, the silicone surfactant was introduced as a 1% to 5% solution in propoxylated butanol as a carrier. PDMS compositions (Mixtures 1–4) according to the formula $Me_3Si(OSiMe_2)_nOSiMe_3$ were used. Their compositions, as determined by gas chromatographic analysis, are presented in Tables 1, 3 and 5. Silicone species present at less than 0.2 wt % are not shown, and the remaining percentages have been normalized such that their sum is 100%.

EXAMPLE 1

Formulation A was reacted together using PDMS Mixtures 1 and 2 shown in Table 1 to produce flexible polyurethane foam pads.

TABLE 1

| n | PDMS 1 (wt %) | PDMS 2 (wt %) |
|---|---|---|
| 3 | 0.6 | 21.5 |
| 4 | 1.6 | 31.3 |
| 5 | 25.8 | 27.6 |
| 6 | 45.8 | 19.4 |
| 7 | 23.7 | 0.2 |
| 8 | 2.5 | |

The experiment was performed on a Krauss Maffei full scale foam production machine. All the components except for the MDI were pre-blended and placed in a separate tank of the machine. These chemicals were routinely circulated and maintained at 25° C. A 16.1 dm³ mold that was temperature controlled to 60° C. was used. A sufficient amount of the reaction mixture was used such that the final foam pad had an overall density of 55 kg/m³. The foam was removed from the mold in 5 minutes and tested for initial force-to-crush (FTC) 45 seconds after demold by crushing the foam to 50% of its initial width. Force-to-Crush (FTC) was measured in absolute pounds (Newtons), with the test plate having a surface area of 50 in²(323 cm²).

The use levels of the PDMS mixtures and the corresponding FTC results are shown in Table 2:

TABLE 2

| Run | PDMS Mixture | Parts$^a$ | FTC (kPa) |
|---|---|---|---|
| 1 | 2 | 0.05 | 120 |
| 2 | 1 | 0.01 | 142 |
| 3 | 1 | 0.03 | 131 |
| 4 | 1 | 0.05 | 93 |
| 5 | 1 | 0.10 | 90 |

$^a$active parts by weight of PDMS

The data show the distribution of PDMS fluids composing PDMS Mixture 1 at 0.05 parts is significantly more efficient at lowering FTC than 0.05 parts of PDMS Mixture 2. It also shows that increasing the amount of PDMS Mixture 1 in a flexible molded foam does not increase foam tightness and that a plateau is reached in terms of the maximum amount of cell opening that can be achieved.

EXAMPLE 2

Formulation B was reacted together using PDMS Mixtures 1 and 3 shown in Table 3 to produce flexible polyurethane foam pads.

TABLE 3

| n | PDMS 1 (wt %) | PDMS 3 (wt %) |
|---|---|---|
| 3 | 0.6 | |
| 4 | 1.6 | 0.2 |
| 5 | 25.8 | 5.0 |
| 6 | 45.8 | 47.3 |
| 7 | 23.7 | 30.4 |
| 8 | 2.5 | 14.3 |
| 9 | | 2.8 |

The foams were made using a hand-mix technique that is familiar to those skilled in the art. First, the amine catalyst, diethanolamine, and water pre-blend was made and set aside. The surfactant and polyols were placed in a 1.9 liter cup and mixed at 6000 rpm for 25 seconds. Next, the amine pre-blend was added to the cup, and the contents were mixed for an additional 20 seconds. The MDI was added and mixed with the rest of the contents in the cup for a final 5 seconds. Finally, the reaction mixture was poured into a 9.44 dm³ mold that was temperature controlled to 52° C. A sufficient amount of the reaction mixture was used such that the final foam pad had an overall density of 45 kg/m³ The foam was removed from the mold after 355 seconds and tested for initial FTC 45 seconds after demold. Airflows were measured on crushed, fully cured foam pads, with higher values indicating a more open foam. The results are shown in Table 4.

TABLE 4

| Foam Property | PDMS 1 | PDMS 3 |
|---|---|---|
| Initial FTC (lb; N) | 140; 620 | 180; 800 |
| Airflow (cfm; sLm*) | 2.25; 63.7 | 1.75; 49.6 |

*sLm - standard Liters per minute

This data shows that incorporating PDMS Mixture 3 in foam Formulation B produced a foam with a higher initial FTC and lower airflow than the corresponding foam made with PDMS Mixture 1. This result demonstrates that increasing amounts of n=8 or higher species at the expense of n=5 had a negative impact on the resulting foam.

EXAMPLE 3

Formulation C was reacted together using PDMS Mixtures 1 and 4 shown in Table 5 to produce flexible polyurethane foam pads.

TABLE 5

| n | PDMS 1 (wt %) | PDMS 4 (wt %) |
|---|---|---|
| 3 | 0.6 | |
| 4 | 1.6 | |
| 5 | 25.8 | 2.4 |
| 6 | 45.8 | 27.6 |
| 7 | 23.7 | 23.5 |
| 8 | 2.5 | 20.0 |
| 9 | | 15.8 |
| 10 | | 10.4 |
| 11 | | 0.3 |

The foams were made using a hand-mix technique that was similar to the one described in Example 2. The reaction mixture was poured into a 9.44 dm³ mold that was temperature controlled to 70° C. A sufficient amount of the reaction mixture was used such that the final foam pad had an overall density of 40 kg/m³. The foam was removed from the mold after 275 seconds and crushed 45 seconds later. The results are shown in Table 6:

TABLE 6

| Run | PDMS 1, (pbw)[α] | PDMS 4, (pbw)[α] | DC5043 (pbw) | FTC (lb; N) | Airflow (cfm; sLm) | Surface quality[β] |
|---|---|---|---|---|---|---|
| 1 | — | — | — | 86; 382 | 3.87; 109 | 1 |
| 2 | — | — | 0.4 | 230; 1023 | 2.42; 68.5 | 4 |
| 3 | — | — | 0.8 | 258; 1147 | 1.22; 34.5 | 4.2 |
| 4 | 0.04 | — | — | 89; 395 | 3.31; 93.8 | 4 |
| 5 | — | 0.04 | — | 221; 983 | 1.77; 50.1 | 4.4 |
| 6 | 0.02 | — | 0.4 | 195; 866 | 2.83; 80.2 | 4.3 |
| 7 | — | 0.02 | 0.4 | 222; 987 | 1.56; 44.2 | 4.4 |

[α]active parts by weight of PDMS
[β]Qualitative ranking (1 to 5) with 1, 4, and 5 corresponding to the worst, minimum requirement, and highest possible rating, respectively.

The foam without any silicone surfactant had an unacceptably low surface quality rating of 1. Dabco DC 5043 organomodified PDMS fluid improved the surface quality but simultaneously markedly increased the FTC and reduced the airflow values. Runs 4 and 5 show that PDMS Mixtures 1 and 4 both improved surface quality; however only Mixture 1 could do so without simultaneously increasing FTC and lowering the airflow. Runs 6 and 7 demonstrated that only PDMS Mixture 1 lowered force to crush when used in combination with DC 5043 organomodified PDMS.

While the advantages in removing the higher molecular weight components normally present in a PDMS fluid (i.e., n=8 and higher in structure 1) in order to make a non-shrinking flexible foam are known, the uniqueness of the present invention is that minimizing the lower molecular weight components present in a PDMS fluid (i.e., n=4 or less) also significantly increases its cell opening efficiency when used in a flexible foam, as measured by FTC. The production of a composition comprising PDMS fluid molecular weight distribution of n=5, 6 and 7 is economically practical. Its enhanced efficiency over other commercially available PDMS fluids could deliver significant cost savings in a surfactant blend, as the PDMS fluid portion of such blends are typically one of the most expensive components and potentially could now be incorporated at a lower percentage of the entire blend.

We claim:

1. A method for preparing a polyurethane flexible foam which comprises reacting an organic polyisocyanate with a polyol in the presence of urethane catalyst, water as a blowing agent, optionally a cell opener, and a polydimethylsiloxane cell stabilizer composition which comprises at least 90 wt % of polydimethylsiloxane molecules having the formula:

$$Me_3Si(OSiMe_2)_nOSiMe_3$$

where n is 5 to 7, provided at least 15 wt % of each of the three molecules in which n is 5, 6 and 7 is present.

2. The method of claim 1 in which the polydimethylsiloxane composition comprises at least 95 wt % of polydimethylsiloxanes where n is 5 to 7.

3. The method of claim 1 in which the polydimethylsiloxane composition comprises at least 20 wt % of each polydimethylsiloxane where n is 5 to 7.

4. The method of claim 1 in which the polydimethylsiloxane composition is used in an amount of 0.01 to 0.8 parts per hundred parts polyol.

5. The method of claim 4 in which the polydimethylsiloxane composition comprises at least 95 wt % of polydimethylsiloxanes where n is 5 to 7.

6. The method of claim 4 in which the polydimethylsiloxane composition comprises at least 20 wt % of each polydimethylsiloxane where n is 5 to 7.

7. The method of claim 5 in which the polydimethylsiloxane composition comprises at least 20 wt % of each polydimethylsiloxane where n is 5 to 7.

8. The method of claim 1 in which the polydimethylsiloxane composition is used in an amount of 0.03 to 0.1 parts per hundred parts polyol and the polyisocyanate is diphenylmethane diisocyanate.

9. The method of claim 8 in which the polydimethylsiloxane composition is used in an amount of about 0.05 parts per hundred parts polyol.

10. The method of claim 1 in which the polydimethylsiloxane cell stabilizer composition is used in combination with an organomodified polydimethylsiloxane or a silicone cell opener.

11. A polyurethane flexible molded foam composition prepared by mixing the following components in parts by weight (pbw):

| | |
|---|---|
| Polyol | 20–100 |
| Polymer Polyol | 80–0 |
| Silicone Surfactant Cell Stabilizer | 0.01–0.8 |
| Cell Opener | 0–3 |
| Water | 1–6 |
| Auxillary Blowing Agent | 0–10 |
| Crosslinker | 0.5–2 |
| Urethane Catalyst | 0.3–3 |
| Isocyanate Index | 70–115 | in which the silicone surfactant cell stabilizer is a polydimethylsiloxane composition which comprises at least 90 wt % of polydimethylsiloxane molecules having the formula:

$$Me_3Si(OSiMe_2)_nOSiMe_3$$

where n is 5 to 7, provided at least 15 wt % of each of the three molecules in which n is 5, 6 and 7 is present.

12. The foam composition of claim 11 in which the polydimethylsiloxane composition comprises at least 95 wt % of polydimethylsiloxanes where n is 5 to 7.

13. The foam composition of claim 11 in which the polydimethylsiloxane composition comprises at least 20 wt % of each polydimethylsiloxane where n is 5 to 7.

14. The foam composition of claim 11 in which the polydimethylsiloxane composition is used in an amount of 0.05 to 0.4 parts per hundred parts polyol.

15. The foam composition of claim 14 in which the polydimethylsiloxane composition comprises at least 95 wt % of polydimethylsiloxanes where n is 5 to 7.

16. The foam composition of claim 14 in which the polydimethylsiloxane composition comprises at least 20 wt % of each polydimethylsiloxane where n is 5 to 7.

17. The foam composition of claim 15 in which the polydimethylsiloxane composition comprises at least 20 wt % of each polydimethylsiloxane where n is 5 to 7.

18. The foam composition of claim 11 in which the polydimethylsiloxane composition is used in an amount of 0.03 to 0.1 parts per hundred parts polyol and the polyisocyanate is diphenylmethane diisocyanate.

19. The foam composition of claim 18 in which the polydimethylsiloxane composition is used in an amount of about 0.05 parts per hundred parts polyol.

20. The foam composition of claim 11 in which the polydimethylsiloxane cell stabilizer composition is used in combination with an organomodified polydimethylsiloxane or a silicone cell opener.

* * * * *